R. H. WELLES.
ELECTRICAL CONNECTOR.
APPLICATION FILED APR. 19, 1913.
Reissued Aug. 12, 1913. 13,605.
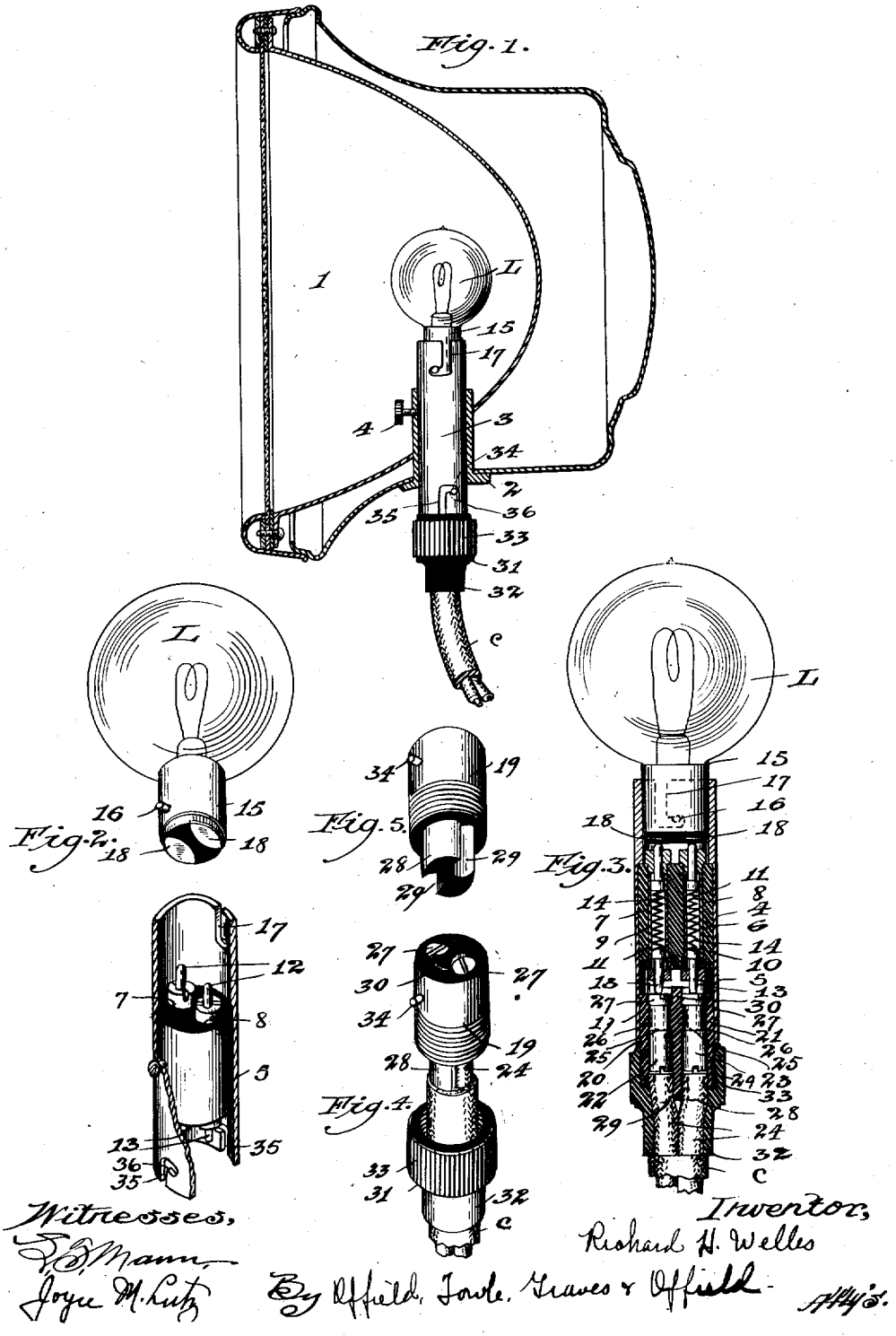

UNITED STATES PATENT OFFICE.

RICHARD H. WELLES, OF KENOSHA, WISCONSIN, ASSIGNOR TO THE BADGER BRASS MANUFACTURING COMPANY, OF KENOSHA, WISCONSIN, A CORPORATION OF WISCONSIN.

ELECTRICAL CONNECTOR.

13,605. Specification of Reissued Letters Patent. Reissued Aug. 12, 1913.

Original No. 1,054,809, dated March 4, 1913, Serial No. 632,768. Application for reissue filed April 19, 1913. Serial No. 762,421.

*To all whom it may concern:*

Be it known that I, RICHARD H. WELLES, a citizen of the United States, residing in the city of Kenosha, in the county of Kenosha and State of Wisconsin, have invented certain new and useful Improvements in Electrical Connectors, of which the following is a specification.

This invention relates to improvements in electrical connectors, and in the present instance is shown as applied to an electrically lighted headlight.

Among the salient objects of the invention are to provide improved means for preventing short-circuiting of contact terminals or the ends of electrical conductors, particularly when such terminals must be connected to a relatively small socket holder or other fixture; to provide in a construction of the above character a combined terminal socket and insulating bridge piece which receives the contact terminals and at the same time keeps them effectively insulated from each other; to provide in such a construction a secondary insulating bridge piece which prevents accidental short-circuiting between the terminals when the latter are disconnected from the fixture; to provide in a construction of the above character a cap or fitting which locks the terminals to the connector and also the connector to the lamp socket or fixture; to provide a construction which is adapted for use with various kinds of electric sockets or other electric connections; to provide a device characterized by its simplicity and economy of construction and which can be readily connected to or disconnected from the contact terminals; and in general to provide an improved construction of the character referred to.

The invention consists in the matters herein described and more particularly pointed out in the appended claims.

Referring to the drawings Figure 1 is a vertical sectional view of an electric headlight equipped with my invention, Fig. 2 is a detail perspective view with parts shown in fragmentary section of one form of lamp fixture, the lamp proper being shown disconnected, Fig. 3 is a vertical sectional view showing the connector secured to the lamp fixture, Fig. 4 is a detail perspective view showing the electrical connector and locking cap, and Fig. 5 is a detail perspective view of the connector proper.

Heretofore difficulty has been experienced in preventing short-circuiting between contact terminals when the latter are connected to small fixtures. For example, in electrical automobile lamps the electric light fixtures are relatively small, while the conductors themselves are relatively large, and considerable difficulty has been experienced in properly applying, in the small space allowed, the terminals of the supply conductors for the lamps in such way as to prevent short-circuiting thereof. Connectors have been used comprising usually a rubber plug with contact pins extending therethrough. In soldering the supply wires to such pins the rubber plug is usually injured.

The present invention not only effectively prevents any possibility of short-circuiting, but also provides means whereby the terminals may be readily and quickly secured to the connector to plug.

Referring to the drawings, 1 designates an electric headlight, at the lower end of which is fixed a bushing 2 through which extends the lamp fixture 3 which may be locked in position by a set screw 4. This fixture 3 comprises a cylindrical sleeve or shell 5, centrally within which is fixed a block 6 of insulating material having two vertical bores 7 and 8 through which extend electrical connecting members 9 and 10. As shown, each of these members comprises a sleeve 11 and contact pins 12 and 13 which are slidable through the heads of the sleeve and are pressed outwardly by a compression spring 14. The upper end of the sleeve 5 receives the base 15 of the lamp, L, and the lamp is locked to the sleeve by pins 16 engaging in bayonet slots 17 to thus form a bayonet coupling. The lower end of the lamp base has contact plates 18 which engage with the pins 12 which are held in firm electrical contact therewith by the springs 14.

Describing now the electrical connector which forms the salient feature of my invention, this connector comprises a cylindrical plug 19 having longitudinal bores 20 and 21 for receiving the metal terminal tips 22 and 23 soldered or otherwise secured to the ends of the supply conductors 24. The upper end of each terminal tip is of reduced diameter to leave a shoulder 25 for engaging the lower end of a flange 26 in the corresponding bore of the plug, the end of each tip receiving a screw 27 whose head engages the upper end of the flange, thus securely clamping the pins within the plugs. In order to prevent the terminal pins from becoming short-circuited as they are inserted into or withdrawn from the plug, and also to prevent the conductors immediately adjacent the pins from being squeezed together to be thus short-circuited, I provide an extension 28 on the base of the plug which bridges between the terminal tips, and the semi-cylindrical channels 29 receiving the conductors rigidly hold the conductors and thus prevent loosening or disconnection thereof on the terminal pins. Also, to prevent short-circuiting between the heads of the screws 27 a short projection 30 on the plug bridges between these screws, so that the screws will not be short-circuited upon engagement of the plug end with a metallic surface. Member 31 has the sleeve part 32 for receiving the conductor cable *c* and the flange part 33 which is internally threaded to have threaded engagement with the lower end of the plug 19. The plug 19 fits the lower end of the fitting sleeve 5 and is locked therein by the engagement of pins 34 with bayonet slots 35 in sleeve 5, and when the plug is thus locked to the sleeve the screws 27 are held in firm electrical engagement with the contact pins 13 by the force of the springs 14. The flange 33 of the cap frame 31 abuts against the lower edge of the sleeve 5 when screwed up on the plug, and thus the pins 34 are securely locked in the bayonet slots, the horizontal faces 36 of these slots being slightly concave, as best shown in Fig. 2, to receive the pins and to prevent rotation of the plug after the cap has been screwed against the sleeve 5.

I thus provide connector mechanism which can be readily applied and secured to electric fixtures and to which supply conductor terminal pins can be readily applied and secured without any danger of short-circuiting thereof.

I do not of course desire to be limited to the precise construction and arrangement and adaptation shown, as changes and modifications are, of course, possible which would still come within the scope of the invention, and I therefore claim the following:

Claims:

1. In an electrical connector, the combination of a cylindric body part of insulating material, a short cylindrical extension from the base of said body part and of less diameter than said body part, a longer cylindrical extension from the head of the body part and of less diameter than said body part, parallel bores extending entirely through said body part and said cylindric extensions, part of the bore within the body part being of less diameter to form outer and inner shoulders, terminal tips engaging in said bores within the body part and abutting against the inner shoulders, screws extending into the other end of said bores and abutting against the outer shoulders and having threaded engagement with said tips, the outer faces of said screws being substantially flush with the base of the body part but bridged between by the short cylindric extension, and terminal conductors extending through the bores of said head cylindric extension and said body part and secured in suitable holes in said tips, the ends of said conductors being bridged between by said head cylindric extension.

2. In an electrical connector, the combination of a cylindric body part of insulating material, a short cylindrical extension from the base of said body part and of less diameter than the body part, a longer cylindrical extension from the head of the body part and of less diameter than said body part, parallel bores extending entirely through said body part and said cylindric extensions, part of the bore within the body part being of less diameter to form outer and inner shoulders, terminal tips engaging in said bores within the body part and abutting against the inner shoulders, screws extending into the other end of said bores and abutting against the outer shoulders and having threaded engagement with said tips, the outer faces of said screws being substantially flush with the base of the body part but bridged between by the short cylindric extension, terminal conductors extending through the bores of said head cylindric extension and said body part and secured in suitable holes in said tips, the ends of said conductors being bridged between by said head cylindric extension, and a cap having a cylindric bore for receiving the conductors and internally threaded at one end for engagement with threads on said body part.

3. In an electrical connector, the combination of a sleeve, a block within said sleeve carrying contact pins, a plug having a body part for fitting into said sleeve, said sleeve having a bayonet slot and said body part having a pin for engaging in said slot, terminal tips within said body part for receiving conductor terminals, a cap having an opening for receiving said conductors and having internal threads at one end for engaging with threads on the body part, the end of the bayonet slot being notched for receiving the body part pin and said cap abutting against the sleeve end to securely lock the pin in said slot to thereby securely lock the body part to said sleeve.

4. In an electrical connector, the combination with a cylindrical shell-like casing adapted to receive contact tips and an electrical fixture, of an insulating plug having detachable connection with said casing and provided with a pair of longitudinally extending bores, a reduced insulating cylindrical extension at the outer end of said plug provided with oppositely disposed grooves, contact screws in the upper end of said bores, a pair of flexible conductors lying in said bores and grooves bridged by said insulated extension, and means for detachably locking the plug in the casing.

5. In an electrical connector, the combination with a casing adapted to receive contact members and an electrical fixture at one end, of an insulating plug detachably seated in the other end of said casing and provided with a pair of longitudinally extending bores, an insulating extension on the outer end of the plug and provided with a pair of oppositely disposed grooves, a pair of flexible conductors engaging said bores and grooves and bridged by said extension whereby short-circuiting of the conductors is prevented on the removal of the plug, and means for detachably locking the plug in the casing.

RICHARD H. WELLES.

Witnesses:
ALBERT H. GRAVES,
EMILIE ROSE.